United States Patent [19]
Zheng et al.

[11] Patent Number: 6,167,175
[45] Date of Patent: Dec. 26, 2000

[54] METHOD AND SYSTEM FOR PROVIDING AN IMPROVED THREE PORT WAVELENGTH DIVISION MULTIPLEXER

[75] Inventors: Yu Zheng; Feng Liu, both of Sunnyvale; Steven Guoxin Zhu, Fremont, all of Calif.

[73] Assignee: Oplink Communications, Inc., San Jose, Calif.

[21] Appl. No.: 09/349,549

[22] Filed: Jul. 8, 1999

Related U.S. Application Data

[62] Division of application No. 08/918,357, Aug. 26, 1997, Pat. No. 5,946,435.

[51] Int. Cl.$^7$ .................................................. G02B 6/26
[52] U.S. Cl. .............................. 385/47; 385/147; 385/45
[58] Field of Search ............................... 385/147, 45, 46, 385/47, 48, 22, 134

[56] References Cited

U.S. PATENT DOCUMENTS

| | | | |
|---|---|---|---|
| 5,661,835 | 8/1997 | Kato et al. | 385/92 |
| 5,781,678 | 7/1998 | Sano et al. | 385/45 |
| 5,812,307 | 9/1998 | Naganuma | 359/341 |

*Primary Examiner*—Hung N. Ngo
*Attorney, Agent, or Firm*—Sawyer Law Group LLP

[57] ABSTRACT

A system and method for providing a wavelength division multiplexer is disclosed. In one aspect, the system and method include providing a housing for the wavelength division multiplexer. The housing includes a first port having a first aperture therein, a second port having a second aperture and a first plurality of apertures therein, and a third port having a third aperture and a second plurality of apertures therein. The second and third apertures are coupled to the first aperture. The first plurality of apertures are disposed symmetrically around the second aperture. The second plurality of apertures are disposed symmetrically around the third aperture. In another aspect, the method and system include providing a wavelength division multiplexer. The wavelength division multiplexer includes a first port including a first collimator, a second port coupled to the first port, and a third port coupled to the first port. The second port includes a second collimator and a first plurality of joints for affixing the second collimator. The first plurality of joints is disposed symmetrically around the second collimator. The third port includes a third collimator and a second plurality of joints for affixing the third collimator. The second plurality of joints is disposed symmetrically around the third collimator.

18 Claims, 2 Drawing Sheets

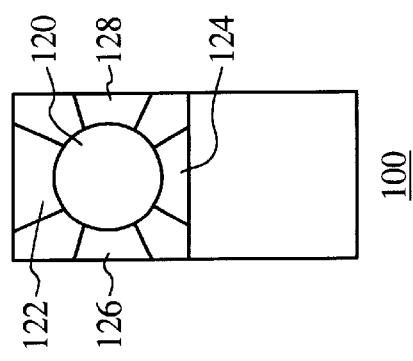
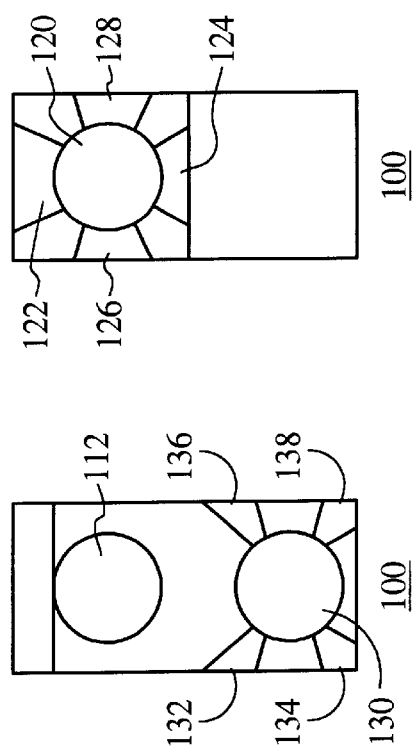
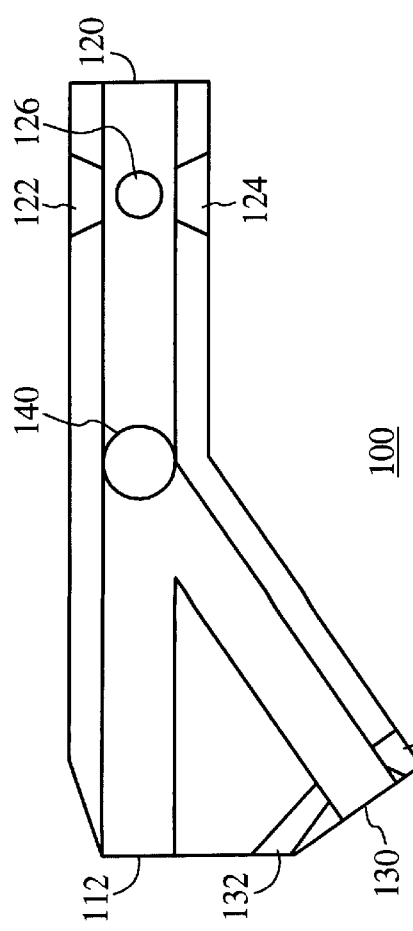
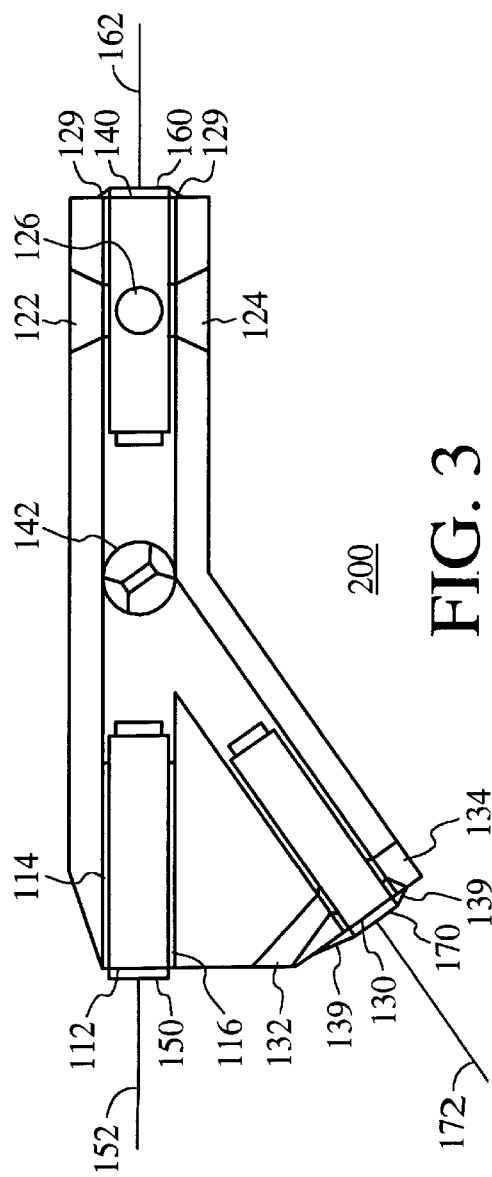

METHOD AND SYSTEM FOR PROVIDING AN IMPROVED THREE PORT WAVELENGTH DIVISION MULTIPLEXER

The present application is a divisional of U.S. Ser. No. 08/918,357 filed Aug. 26, 1997 now U.S. Pat. No. 5,946,435.

FIELD OF THE INVENTION

The present invention relates to a method and system for a wavelength division multiplexer ("WDM") and more particularly to a method and system for implementing a WDM which provides improved reliability and performance.

BACKGROUND OF THE INVENTION

A conventional wavelength division multiplexer ("WDM") is used to combine or separate optical signals having different wavelengths. For example, a three port WDM can be used to combine two optical signals or to separate an incoming signal into two components which have two different wavelengths.

In optical communications, conventional WDMs have many applications. For example, conventional WDMs are often used in optical amplifiers, in which a signal having one wavelength, such as 1550 nanometers ("nm"), can be amplified by combining the signal with a pumping source, for example, a pumping source having a wavelength of 980 nm or 1480 nm. Another application for WDMs is simultaneous transmission of a plurality of optical signals over a single fiber. A conventional WDM combines the signals having wavelengths of 1310 nm and 1550 nm prior to transmission over the single fiber and separates the signals at the receiver.

A large cost in optical technology is the cost of providing optical fibers to carry the optical signal between points. To reduce this cost, there is a trend towards carrying more signals on a single fiber rather than providing additional fibers. As a result, the demand for WDMs used to separate or combine such signals has dramatically increased. As the number of signals per fiber increases, the wavelength of each signal becomes closer to the wavelength of neighboring signals. In response to this decrease in spacing between signals, dense WDMs have been developed. Dense WDMs typically separate or combine optical signals having only small differences in wavelength. The difference between wavelengths of neighboring signals in a dense WDM is typically less than 3.2 nm.

In addition to combining and separating closely spaced signals, WDMs must be reliable and perform well in the environment in which they are placed. For example, there are always transmission losses associated with a conventional WDM. These transmission losses should be small and remain constant throughout operation of the WDM. However, the temperature of the environment in which the WDM operates can vary. Thus, a WDM should have a small transmission loss which is relatively insensitive to temperature. A WDM should also be reliable. Consequently, Bellcore standards for optical components, which concern the reliability of optical components, should also be met.

Although a conventional WDM can separate or combine signals, the reliability and performance of the WDM can be affected by the packaging of the WDM. Typically, in the case of micro-optic WDMs which are based on collimators and thin-film filters, the collimators of a WDM are held in place by epoxy. The epoxy may have a temperature dependence and may not be mechanically reliable. Consequently, the WDM will not have sufficient performance or reliability.

Accordingly, what is needed is a system and method for providing a WDM which has improved reliability. The present invention addresses such a need.

SUMMARY OF THE INVENTION

The present invention provides a method and system for providing a micro-optic wavelength division multiplexer. In one aspect, the system and method comprise providing a housing for the wavelength division multiplexer. The housing comprises a first port having a first aperture therein, a second port having a second aperture and a first plurality of apertures therein, and a third port having a third aperture and a second plurality of apertures therein. The second and third apertures are coupled to the first aperture. The first plurality of apertures are disposed symmetrically around the second aperture. The second plurality of apertures are disposed symmetrically around the third aperture. In another aspect, the method and system comprise providing a wavelength division multiplexer. The wavelength division multiplexer includes a first port including a first collimator, a second port coupled to the first port, and a third port coupled to the first port. The second port includes a second collimator and a first plurality of joints for affixing the second collimator. The first plurality of joints is disposed symmetrically around the second collimator. The third port includes a third collimator and a second plurality of joints for affixing the third collimator. The second plurality of joints is disposed symmetrically around the third collimator.

According to the system and method disclosed herein, the present invention increases reliability while keeping a low temperature dependence, thereby increasing overall system performance.

BRIEF DESCRIPTION OF THE DRAWINGS

FIG. 2a is a block diagram of a side view of one embodiment of a housing in accordance with the method and system.

FIG. 2b depicts one end view of one embodiment of the housing in accordance with the method and system.

FIG. 2c depicts another end view of one embodiment of the housing in accordance with the method and system.

FIG. 3 is a block diagram of a WDM in accordance with the method and system.

DETAILED DESCRIPTION OF THE INVENTION

Figure 1:
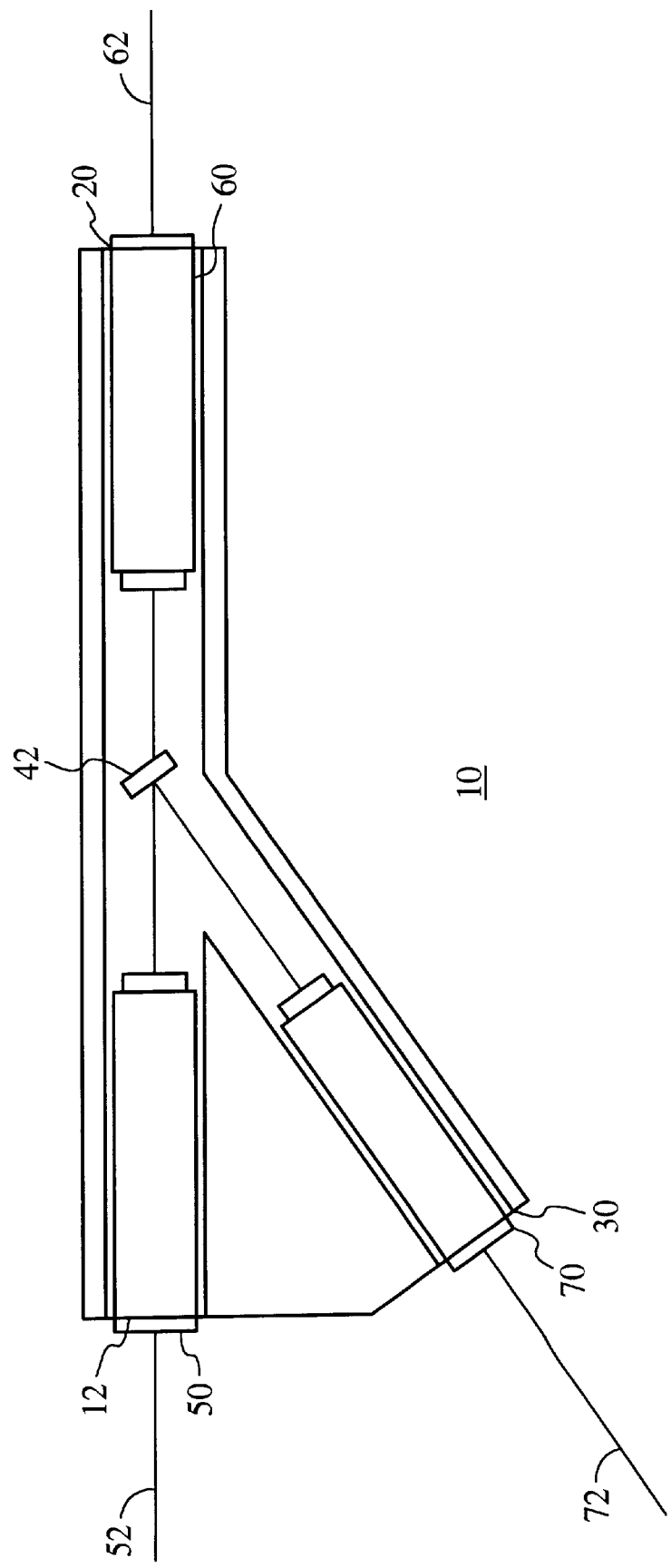
FIG. 1 is a block diagram of a conventional WDM.

The present invention relates to an improvement in micro-optic wavelength division multiplexers ("WDM"). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

FIG. 1 is a block diagram of a conventional three port WDM 10. A conventional WDM is used to combine or separate optical signals. The three port WDM 10 can be used to combine two optical signals or to separate an incoming signal into two components. Conventional WDMs can combine or separate signals having different wavelengths. For example, the three port WDM 10 may separate or combine signals having wavelength λ1 and λ2, where λ1 and λ2 can be any of a variety of wavelengths.

The conventional three port WDM 10, includes a common port 12 having a collimator 50, a pass port 20 including a collimator 60, and a reflection port 30 having a collimator 70. The WDM 10 can be used to separate a combination signal into its components, a first signal and a second signal. The first signal and the second signal have wavelengths λ1 and λ2, respectively. The combination signal enters the WDM 10 through fiber 52. The combination signal is transmitted through the collimator 50 to a narrow band pass filter 42. The filter 42 transmits light having wavelength λ1. Thus, the first signal is transmitted through the filter 42 to the collimator 60 and through the fiber 62. The second signal is reflected to the collimator 70 and through the fiber 72. Consequently, the WDM 10 separates the combination signal into its component signals. If the WDM 10 is used to combine two signals, the first and second signals would enter through fibers 62 and 72, respectively. The signals would be combined, and the combination signal would exit the WDM 10 through the fiber 52.

Although the conventional three port WDM 10 can separate or combine signals, those with ordinary skill in the art will realize that the reliability and performance of the conventional WDM 10 can be adversely affected by the packaging of the conventional WDM 10. Typically, the collimators 50, 60, and 70 of the conventional WDM 10 are held in place by epoxy (not shown) around the inner surface of the common port 12, the pass port 20 and the reflection port 30, respectively. The epoxy may have a temperature dependence and may not be sufficiently mechanically reliable. Consequently, the WDM 10 may not have the requisite performance, for example exhibiting a large temperature dependence for its transmission loss, or may not have the required reliability.

The present invention provides for a method and system for providing an improved WDM made using soldering technology and a unique housing. The present invention will be described in terms of a three port WDM. However, one of ordinary skill in the art will readily recognize that this method and system will operate effectively for other types of WDMs.

To more particularly illustrate the method and system in accordance with the present invention, refer now to FIGS. 2a–2c depicting one embodiment of a housing 100 for a three port WDM in accordance with the method and system. FIG. 2a depicts a side view of the housing 100. The housing includes a common port 112, a pass port 120, and a reflection port 130. FIG. 2b depicts an end view of the housing 100 from the end including the common port 112 and the reflection port 130. FIG. 2c depicts an end view of the housing 100 from the end including the pass port 120. In a preferred embodiment, the housing 100 is made of stainless steel. In addition, in a preferred embodiment of the housing 100, the stainless steel is gold plated. Stainless steel is used because it is relatively easy to solder to, can be gold plated, and has a relatively small coefficient of thermal expansion. The housing 100 includes an aperture 140 in which a filter (not shown) will be placed. In a preferred embodiment, a holder (not shown) containing the filter will be placed in the aperture 140.

The housing 100 includes apertures 122, 124, 126, and 128 arranged symmetrically around the pass port 120. The housing 100 also includes apertures 132, 134, 136, and 138 arranged symmetrically around the reflection port 130. The apertures 122 through 128 and 132 through 138 are used for soldering collimators to the pass port 120 and the reflection port 130.

FIG. 3 depicts one embodiment of a WDM 200 utilizing housing 100 in accordance with the method and system. Thus, collimators 150, 160, and 170 have been placed in the common port 112, the pass port 120, and the reflection port 130, respectively, of the housing 100. The WDM 200 includes a filter 142 contained in a holder which has been placed in the aperture 140. The angle at which the filter 142 is held in the aperture 140 can be adjusted to ensure the filter 142 only transmits light of the desired wavelength. In accordance with the method and system, the WDM 200 is manufactured by using solder technology to affix certain components to the housing 100.

In one embodiment of the method and system, the collimator 150 is affixed to the common port 112 using epoxy. Consequently, epoxy joints 114 and 116 surround the collimator 150. The diameter of the common port 112 very closely matches the diameter of the collimator 150, allowing the collimator 150 to fit tightly within the common port 112. Thus, it is relatively simple to use epoxy to hold the collimator 150 in place. Similarly, the holder for the filter 142 is held in the aperture 140 by epoxy. However, the remaining collimators 160 and 170 are held in place by solder, shown in black, which is placed symmetrically around the ports 120 and 130, respectively, in apertures 122 through 128 and 132 through 138, respectively. In addition, in one embodiment, the collimators 160 and 170 are also held in place by solder joints 129 and 139, respectively.

The apertures 122 through 128 and 132 through 138 and, therefore, the solder joints made by placing solder in the apertures 122 through 128 and 132 through 138 are symmetric. This symmetry and the use of solder in forming the joints allow for greater mechanical stability of the collimators 160 and 170. In a preferred embodiment, the apertures 122 through 128 and 132 through 138 are each placed approximately ninety degrees apart along the outside surface of the pass port 120 and the reflection port 130, respectively. Although the WDM 200 and housing 100 are described as having four symmetric solder joints and four symmetric apertures, respectively, around the reflection port and pass port, nothing prevents the use of another number of symmetric solder joints or apertures, respectively.

Use of soldering technology and symmetric solder joints provides improved mechanical stability. As a result, the WDM 100 is more reliable. In addition, because the coefficient of thermal expansion of the stainless steel housing 100 is relatively low, limiting the temperature dependence of the behavior of the WDM 200. Thus, performance of the WDM 200 is improved.

A method and system has been disclosed for an improved WDM. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A housing for use in a wavelength division multiplexer comprising:

a first port, the first port having a first aperture therein;

a second port having a second aperture and a first plurality of apertures therein, the second aperture being coupled to the first aperture, the first plurality of apertures being disposed symmetrically around the second aperture; and a third port having a third aperture and a second plurality of apertures therein, the third aperture being coupled to the first aperture, the second plurality of apertures being disposed symmetrically around the third aperture.

2. The housing of claim 1 wherein the first aperture further includes a first axis, and the second aperture further includes a second axis, the second axis and the first axis forming substantially a single line.

3. The housing of claim 2 wherein each of the first plurality of apertures further includes a first corresponding axis, the first corresponding axis of each of the first plurality of apertures being substantially perpendicular to the second axis.

4. The housing of claim 3 wherein the third aperture further includes a third axis; and wherein each of the second plurality of apertures further includes a second corresponding axis, the second corresponding axis of each of the second plurality of apertures being substantially perpendicular to the third axis.

5. The housing of claim 4 further comprising:

a fourth aperture having a fourth axis, the fourth aperture being coupled to the first aperture, the fourth axis being substantially perpendicular to the first axis.

6. The housing of claim 5 wherein the first plurality of apertures further comprises four apertures separated by approximately ninety degrees.

7. The housing of claim 6 wherein the second plurality of apertures further comprises four apertures separated by approximately ninety degrees.

8. The housing of claim 7 wherein the housing further comprises a stainless steel housing.

9. The housing of claim 8 wherein the housing further comprises a gold-plated stainless steel housing.

10. A method of providing housing for use in a wavelength division multiplexer, the method comprising the steps of:

providing a first port, the first port having a first aperture therein;

providing a second port having a second aperture and a first plurality of apertures therein, the second aperture being coupled to the first aperture, the first plurality of apertures being disposed symmetrically around the second aperture; and providing a third port having a third aperture and a second plurality of apertures therein, the third aperture being coupled to the first aperture, the second plurality of apertures being disposed symmetrically around the third aperture.

11. The method of claim 10 wherein the first aperture further includes a first axis, and the second aperture further includes a second axis, the second axis and the first axis forming substantially a single line.

12. The method of claim 11 wherein the step of providing the second port further comprises the step of:

providing a first plurality of corresponding axes, each of the first plurality of corresponding axes corresponding to each of the first plurality of apertures, each of the first plurality of corresponding axes being substantially perpendicular to the second axis.

13. The method of claim 12 wherein the third aperture further includes a third axis; and wherein the step of providing the third port further comprises the step of:

providing a second plurality of corresponding axes, each of the second plurality of corresponding axes corresponding to each of the second plurality of apertures, each of the second plurality of corresponding axes being substantially perpendicular to the third axis.

14. The method of claim 13 further comprising the step of:

providing a fourth aperture having a fourth axis, the fourth aperture being coupled to the first aperture, the fourth axis being substantially perpendicular to the first axis.

15. The method of claim 14 wherein the step of providing the first plurality of apertures further comprises the step of: providing four apertures separated by approximately ninety degrees.

16. The method of claim 15 wherein the step of providing the second plurality of apertures further comprises the step of providing four apertures separated by approximately ninety degrees.

17. The method of claim 16 wherein the housing further comprises a stainless steel housing.

18. The method of claim 17 wherein the housing further comprises a gold-plated stainless steel housing.

* * * * *